(No Model.)
H. THEIS.
NUT LOCK.
No. 595,746. Patented Dec. 21, 1897.
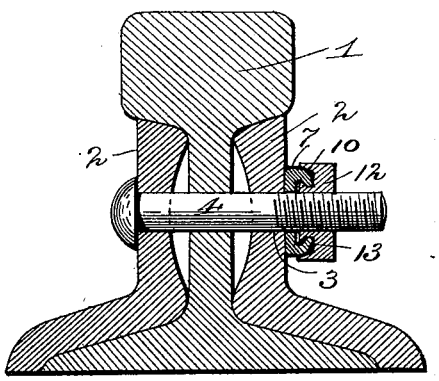
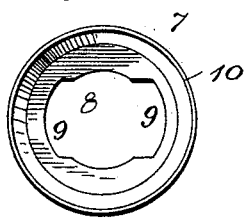
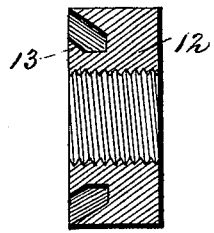
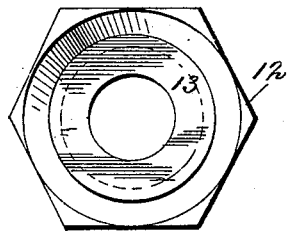
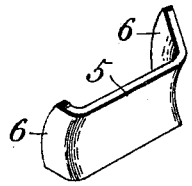
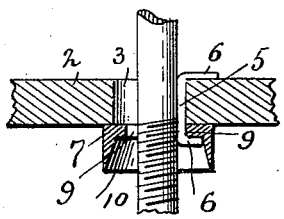
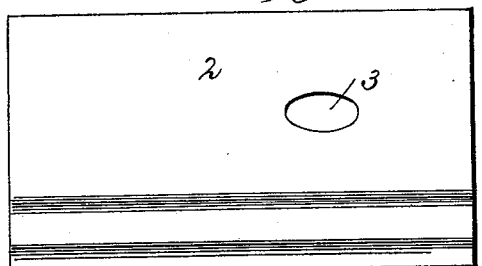
Witnesses:
Franck L. Ourand.
Jno. L. Coombs
Inventor:
Henry Theis
by Louis Bagger & Co.
Attorneys.

UNITED STATES PATENT OFFICE.

HENRY THEIS, OF LAWRENCEBURG, INDIANA.

NUT-LOCK.

SPECIFICATION forming part of Letters Patent No. 595,746, dated December 21, 1897.

Application filed March 10, 1897. Serial No. 626,796. (No model.)

*To all whom it may concern:*

Be it known that I, HENRY THEIS, a citizen of the United States, and a resident of Lawrenceburg, in the county of Dearborn and State of Indiana, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

My invention relates to nut-locks principally designed for use in connection with railway-rails, but which may be used with bolts which connect other objects which are subjected to vibrations which would tend to loosen the nuts.

The invention consists in the novel construction and combination of parts hereinafter fully described and claimed.

In the accompanying drawings, Figure 1 is a transverse sectional view showing a railroad-rail and fish-plate with my improvements applied thereto. Fig. 2 is an elevation of the washer detached, looking from the outer side. Fig. 3 is an elevation of the nut, looking from the inner side. Fig. 4 is a sectional view of the same. Fig. 5 is a perspective view of the key. Fig. 6 is an elevation of the fish-plate, showing the oval bolt-hole. Fig. 7 is a detailed sectional view.

In the said drawings the reference-numeral 1 designates a railroad-rail provided with a bolt-hole, and 2 a fish-plate provided with an oval bolt-hole 3, registering with the bolt-hole in the rail. The numeral 4 designates an ordinary-headed bolt passing through the said holes, and 5 is a key consisting of a curved metal plate having its ends bent at right angles, forming lugs 6. This key is located in the oval hole in the fish-plate, with the curved or concave portion contacting with the bolt and the lugs engaging with the sides of the fish-plate. The numeral 7 designates a washer formed with a central opening 8, with intersecting recesses 9 at opposite sides thereof. This washer is also formed with an outwardly-extending annular flange 10. Fitting on said bolt is a screw-threaded nut 12, having an annular groove in its inner side. This groove has its sides inclined inwardly, as seen in Fig. 4, forming a boss 13, which inclines or slants from the outer to the inner end.

In using the invention the key is passed through the hole in the fish-plate, with the lugs overlapping the sides of the fish-plate and the lug on the outer side seating in one of the recesses 9 in the washer. The bolt is now passed through the bolt-holes and the nut applied and screwed home, when the flange of the washer will engage with the groove in the inner face of the nut and be forced inward, so as to overlap and clench the tapering boss of the nut, so that the latter will be tightly held in place and all liability of backward turning under ordinary circumstances be prevented.

Having thus fully described my invention, what I claim is—

1. In a nut-lock, the combination with the fish-plate having an oval aperture therein, the screw-bolt, the concave key provided with lugs at the ends overlapping the sides of the fish-plate, and the washer having a central opening with an intersecting recess and formed with an annular flange, of the screw-nut formed on its inner face with an annular groove and a tapering boss, substantially as described.

2. In a nut-lock, the combination with the bolt, and the washer having an outwardly-projecting tapering flange extending entirely around the edge or rim, of the screw-nut provided on its inner side with a continuous circular groove, the opposite sides of which are inclined at an angle to the axis of the nut, substantially as described.

In testimony that I claim the foregoing as my own I have hereunto affixed my signature in presence of two witnesses.

HENRY THEIS.

Witnesses:
CHARLES W. STAPP,
WARREN TEBBS.